(12) United States Patent
Vuk et al.

(10) Patent No.: US 6,852,435 B2
(45) Date of Patent: Feb. 8, 2005

(54) FUEL CELL COOLING SYSTEM

(75) Inventors: Carl Thomas Vuk, Denver, IA (US); Peter Finamore, Charlotte, NC (US)

(73) Assignee: Deere & Company, Moline, IL (US)

( * ) Notice: Subject to any disclaimer, the term of this patent is extended or adjusted under 35 U.S.C. 154(b) by 150 days.

(21) Appl. No.: 10/201,004

(22) Filed: Jul. 23, 2002

(65) Prior Publication Data
US 2004/0018405 A1 Jan. 29, 2004

(51) Int. Cl.$^7$ .............................. H01M 8/12; F24F 7/00
(52) U.S. Cl. ............................ 429/26; 429/34; 165/59; 165/104.18
(58) Field of Search .............................. 429/26, 34, 38, 429/12, 120; 165/48.1, 52, 66, 59, 104.18, 132, 164; 261/150, 138, 157, 151; 62/89, 276, 281, 314, 338

(56) References Cited

U.S. PATENT DOCUMENTS

| | | | |
|---|---|---|---|
| 3,498,844 A | * | 3/1970 | Sanderson ................... 429/13 |
| 3,761,316 A | | 9/1973 | Stedman |
| 3,905,884 A | | 9/1975 | Parenti, Jr. et al. |
| 4,623,596 A | | 11/1986 | Kamoshita |
| 4,706,737 A | | 11/1987 | Taylor et al. |
| 4,824,740 A | | 4/1989 | Abrams et al. |
| 4,994,331 A | | 2/1991 | Cohen |
| 5,206,094 A | | 4/1993 | Katz |
| 6,066,408 A | | 5/2000 | Vitale et al. |
| 6,195,999 B1 | | 3/2001 | Arnold et al. |
| 6,584,789 B2 | | 7/2003 | Ishikawa ..................... 62/171 |

* cited by examiner

Primary Examiner—Raymond Alejandro

(57) ABSTRACT

A cooling system is connected to a fuel cell stack which has a hydrogen inlet, an air inlet, a coolant inlet, a coolant outlet and an exhaust water outlet. The cooling system includes a heat exchange unit coupled to the coolant inlet and the coolant outlet, a coolant pump, and a blower for blowing air through the unit. An evaporator is exposed to the blown air, and a conduit communicates exhaust water from the exhaust water outlet to the evaporator. The exhaust water evaporates in and cools the blown air. The evaporator may be a wick mounted on an exterior surface of the heat exchange unit. The evaporator unit may include water injectors which spray exhaust water into the blown air. The injectors are mounted between a blower and a radiator. A removable porous evaporator element is mounted between the injectors and the radiator.

24 Claims, 3 Drawing Sheets

US 6,852,435 B2

FUEL CELL COOLING SYSTEM

BACKGROUND OF THE INVENTION

The present invention relates to a cooling system for a fuel cell module.

The most advanced type of fuel cell, both technically and commercially, is the proton exchange membrane or PEM fuel cell. Current PEM type fuel cells operate at temperatures of around 80° C., which is a lower temperature than the operation temperature of some other types of fuel cells. Because the exhaust does not carry away significant heat, heat rejected to the coolant is relatively high compared to internal combustion engines. This, combined with the relatively low operating temperatures, makes it difficult to cool fuel cell systems. A fuel cell cooling system may require large bulky heat exchangers and may require a cooling fan which consumes large amounts of power. Also hot liquid discharged from fuel cells may kill vegetation and may cause safety problems with slippery floors in enclosed spaces.

SUMMARY

Accordingly, an object of this invention is to provide an improved fuel cell cooling system.

A further object of the invention is to provide such fuel cell cooling system which reduces or eliminates liquid exhaust water discharge.

These and other objects are achieved by the present invention, wherein a cooling system is connected to a fuel cell stack which has a hydrogen inlet, an air inlet, a coolant inlet, a coolant outlet and an exhaust water outlet. The cooling system includes a heat exchange unit coupled to the coolant inlet and the coolant outlet, a coolant pump for circulating coolant therethrough, and a blower for blowing air through the heat exchange unit. The cooling system also includes an evaporator unit exposed to the blown air, and a conduit which communicates exhaust water from the fuel cell stack exhaust water outlet to the evaporator unit. The exhaust water evaporates in the blown air and thereby cools the air and reduces the amount of liquid exhaust water. In one embodiment, the evaporator unit is a wick mounted on an exterior surface of the heat exchange unit. As the exhaust water evaporates it increases the cooling performance of the heat exchange unit.

In another embodiment, the evaporator unit includes a set of water injectors which spray exhaust water into the air as it is blown towards the heat exchange unit. The injectors are mounted on an annular member located in a housing between a blower and a radiator. A removable porous evaporator element may be mounted in the housing between the water injectors and the radiator.

DETAILED DESCRIPTION

Figure 1:
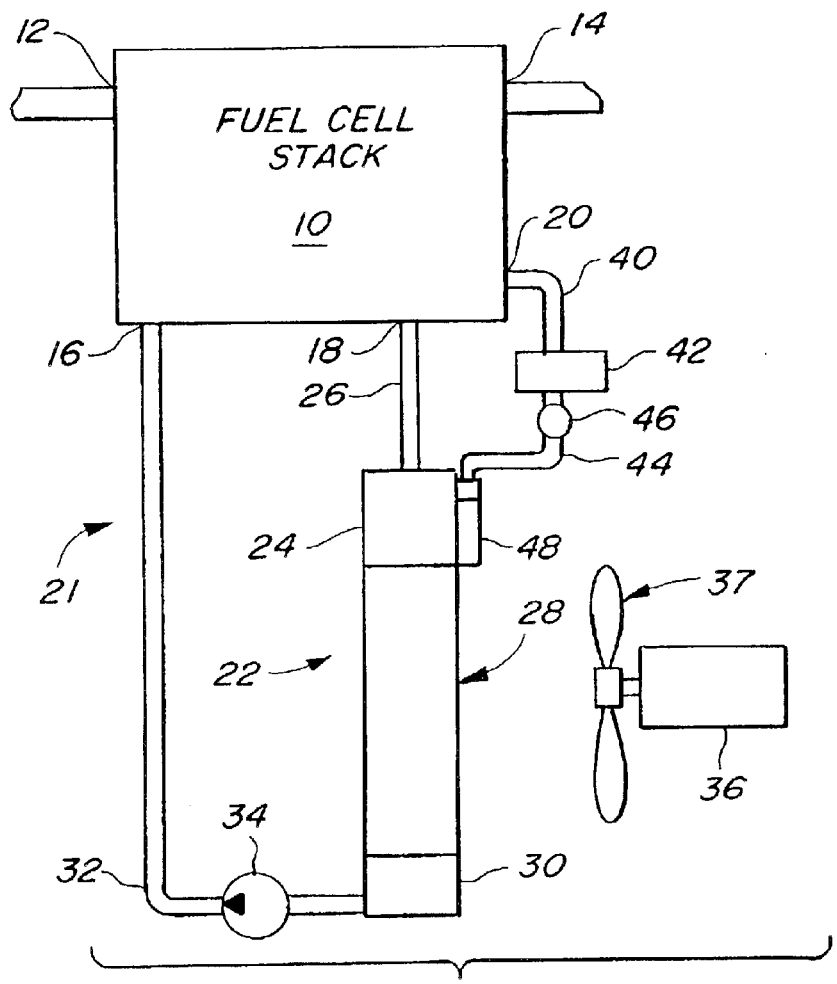
FIG. 1 is a simplified schematic diagram of a fuel cell cooling system according to the present invention.

Referring to FIG. 1, a stack 10 of fuel cells includes a plurality of conventional fuel cells, such as commercially available proton exchange membrane or polymer electrolyte membrane, known as PEM fuel cells (not shown). The stack 10 includes a hydrogen inlet 12, an air inlet 14, a coolant inlet 16, a coolant outlet 18 and an outlet 20 for exhaust water.

The cooling system 21 includes a heat exchanger or radiator 22 which has an upper tank 24 communicated with outlet 20 via line 26, a heat exchange portion 28 and a lower tank 30 communicated with inlet 16 via line 32. A coolant pump 34 is preferably located in line 32 to pump coolant from the lower tank 30 to coolant inlet 16. Motor 36 drives a fan 37 which drives air through heat exchange portion 28.

Water line 40 communicates exhaust water from outlet 18 to a water storage tank 42. Line 44 and valve 46 control communication of exhaust water from tank 42 to a wick module 48 mounted on a surface of the upper tank 24.

Figure 2:
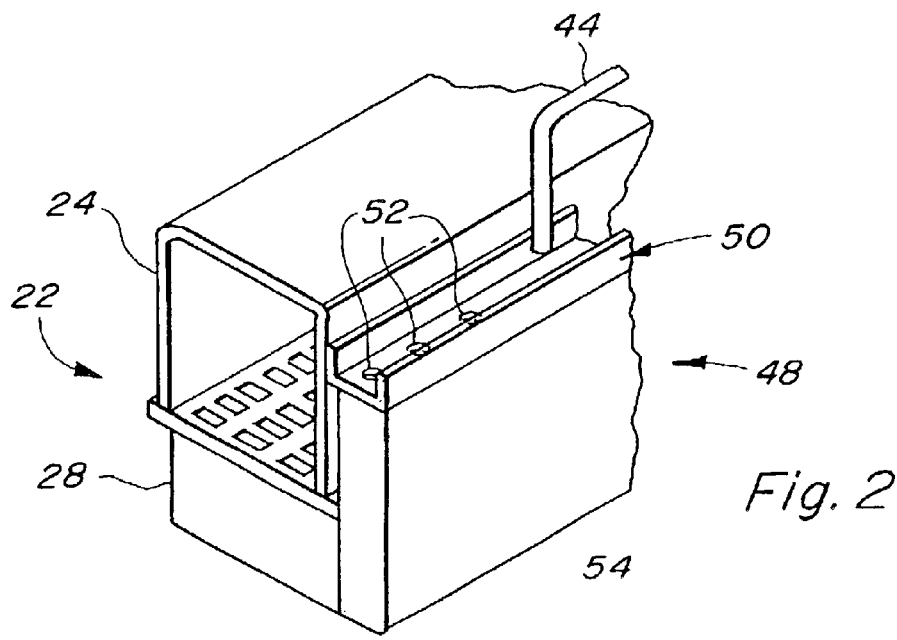
FIG. 2 is a detailed partial sectional perspective view of a portion of FIG. 1.

Referring now to FIG. 2, wick module 48 includes a u-shaped channel 50 fixed, such as by welding or brazing, to an upper portion of radiator tank 24. Line 44 directs exhaust water into the channel 50. The channel 50 includes a plurality of weep holes 52 which permit exhaust water to flow into a wick member 54 which is mounted beneath the channel 50. The wick member 54 is preferably a porous material such as compressed powdered metal. The wick member 54 preferably has a vertical dimension and is positioned so that the bottom edge of the tank 24 is approximately adjacent the middle of the wick member 54, and so that wick member 54 is assured of being exposed to air blown through the radiator 22. The channel 50 and the wick member 54 preferably have a horizontal length which is approximately the same as the horizontal width of the radiator 22.

As the exhaust water evaporates from the wick 54 it extracts heat from the radiator 22 and thereby increases the cooling performance of thereof. Exhaust water may be stored or accumulated in the tank 42 until needed during high cooling load conditions. Then the valve 46 can be opened to supply exhaust water to the wick.

Figure 3:
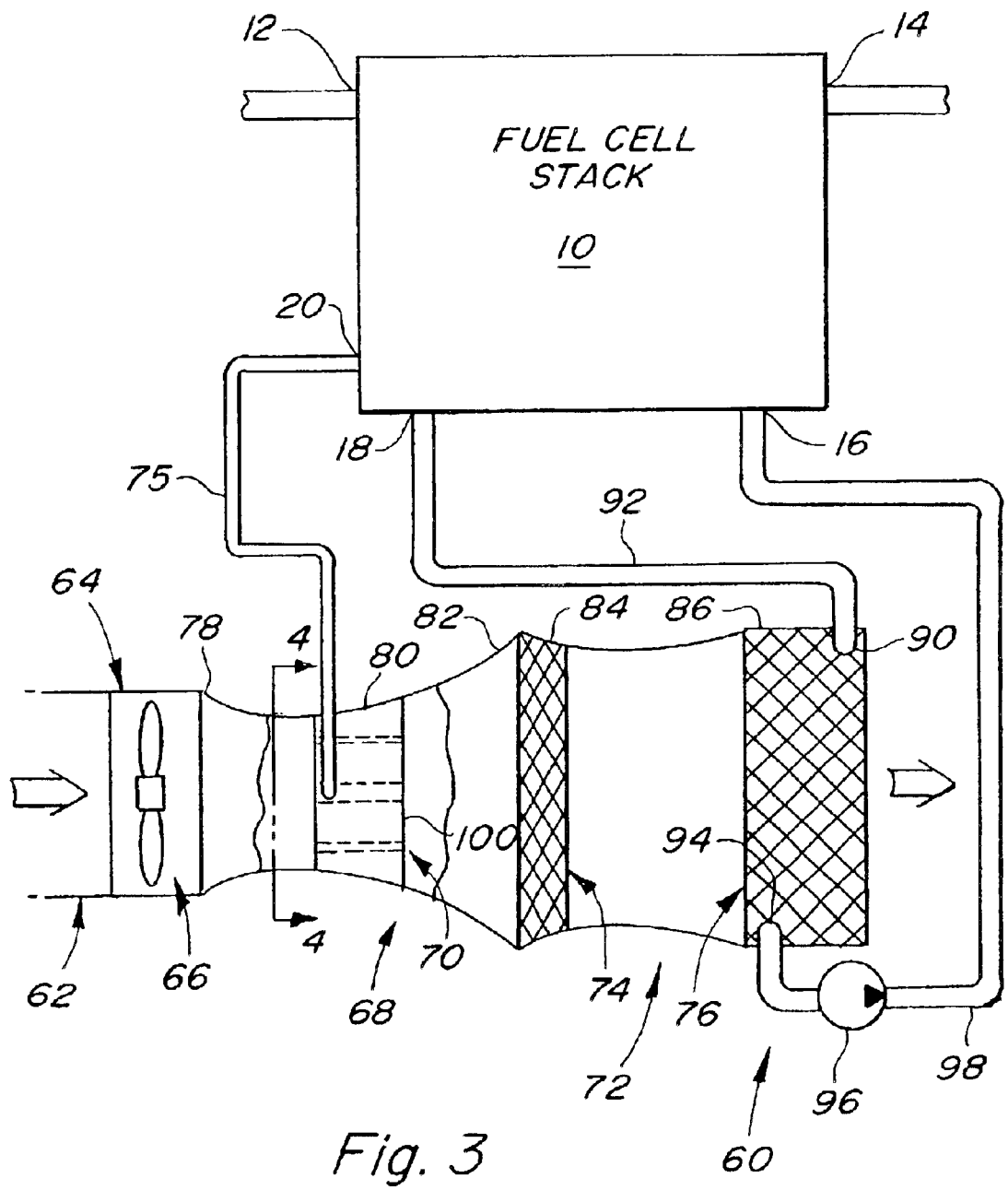
FIG. 3 is a simplified schematic diagram of an alternate embodiment of a fuel cell cooling system according to the present invention.

Referring now to FIG. 3, a cooling system 60 includes a housing 62 with a first cylindrical portion 64 enclosing a blower fan 66, a second cylindrical portion 68 including a water injection unit or injector ring 70, and a third rectangular portion 72 enclosing an evaporator cooling element 74 and a heat exchange unit 76.

First housing portion 64 may be substantially cylindrical with a uniform diameter. Fan 66 blows air from the atmosphere into the second housing portion 68. Second housing portion 68 has a larger diameter first end 78, a smaller diameter central portion 80 and a larger diameter second end 82 which is preferably larger than the diameter of the first end 78. The smaller diameter portion increases the speed of air movement past the injector ring 70, The evaporator cooling element 74 is porous, is mounted in plenum formed by a first end 84 of third housing portion 72, and is preferably removable therefrom. Element 74 assists in the evaporation of exhaust water and removes material from the air stream which would otherwise be deposited on the surfaces of the heat exchange unit 76. A line 75 communicates exhaust water from fuel cell stack water outlet 20 to the injector ring 70.

The heat exchange unit or radiator 76 is mounted in the second end 86 of third housing portion 72. Radiator 76 includes hot coolant inlet 90 communicated via line 92 with coolant outlet 18 of fuel cell stack 10, and a coolant outlet 94 communicated via pump 96 and line 98 to coolant inlet 16 of fuel cell stack 10.

Figure 4:
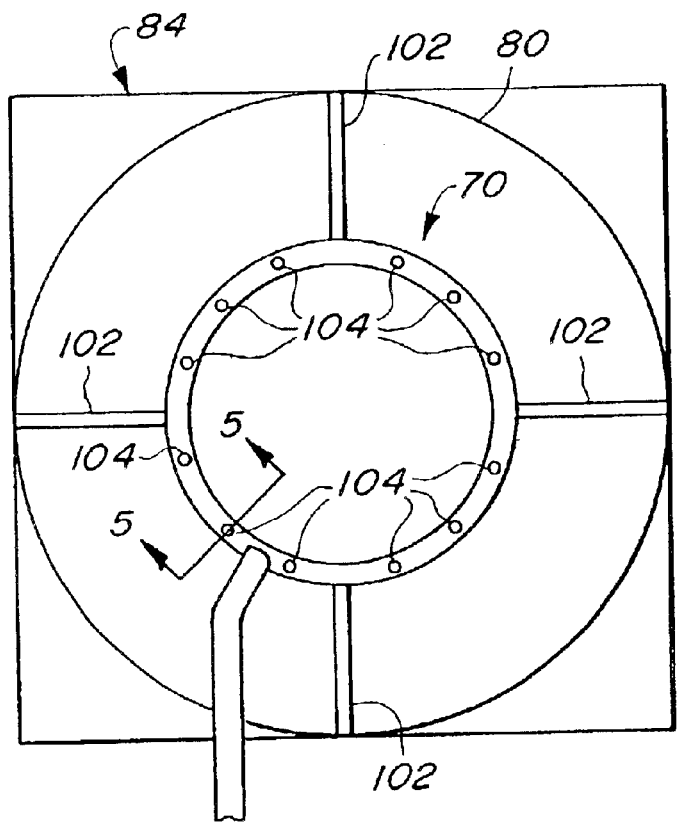
FIG. 4 is a view taken along lines 4—4 of FIG. 3.

Referring now to FIG. 4, the injector ring 70 includes an annular housing or web 100 centrally mounted in housing portion 80 by a plurality of radially extending support members 102. Injector ring 70 includes a plurality of injectors 104 which receive water from fuel cell stack water outlet 20. Each injector 104 produces a spray of exhaust water into the air flowing through the cooling unit 60.

As the exhaust water evaporates in the stream of air blowing past the injector ring 70 it extracts heat from the air and further helps to cool the heat exchanger 76 and thereby increases the cooling performance of thereof.

Figure 5:
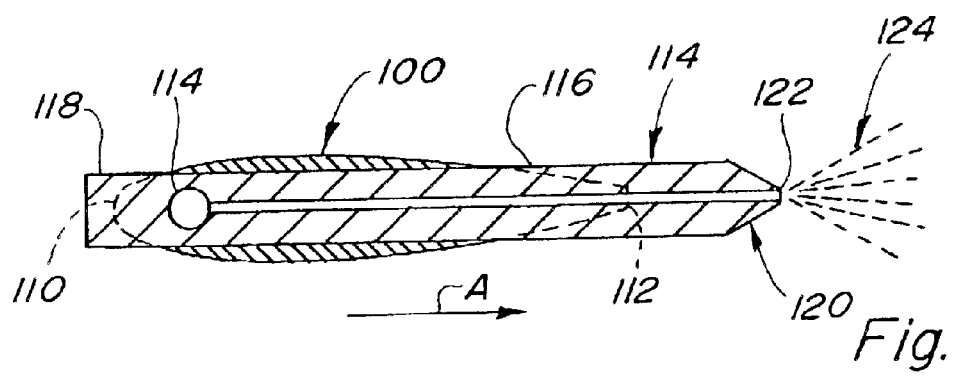
FIG. 5 is a detailed perspective view of a portion of the injector ring in the direction of arrows 5—5 of FIG. 4.

Referring now to FIG. 5, the injector ring annular housing 100 has an aerodynamic cross-sectional shape which tapers from a larger upstream end 110 to a thin smaller edge at its downstream end 112. An annular water supply tube 114 is enclosed in the larger end 110. Supply tube 114 receives stack exhaust water via line 75. Each injector 104 includes a generally cylindrical hollow body 116 with an upstream end 118 which receives water from the supply tube 114. The downstream end 120 of the body 116 forms an orifice or nozzle 122 which discharges a water spray 124 therefrom. Arrow A indicates the direction of airflow past the housing 100.

Figure 6:
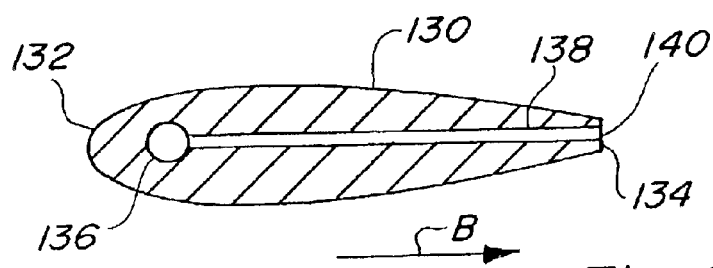
FIG. 6 is a view similar to FIG. 5, but of an alternate embodiment.

Referring now to FIG. 6, in an alternate embodiment the injector ring includes a one-piece annular housing 130 which has an aerodynamic cross-sectional shape which tapers from a larger upstream end 132 to a thin smaller edge at its downstream end 134. An annular water supply bore 136 is enclosed in the larger end 132. Supply bore 136 receives stack exhaust water via line 75. A plurality of injector bores 138 extend generally axially from supply bore 136 to corresponding nozzles 140 at the downstream end 134 of housing 130. Arrow B indicates the direction of airflow past the housing 130.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A cooling system for a fuel cell stack having a coolant inlet, a coolant outlet and an exhaust water outlet, the cooling system comprising:
   a heat exchange unit coupled to the coolant inlet and the coolant outlet;
   a blower for blowing air through the heat exchange unit;
   an evaporator unit having a wick member exposed to the blown air; and
   a conduit communicating exhaust water from the fuel cell stack exhaust water outlet to the evaporator unit, said exhaust water evaporating in the blown air and thereby cooling said air.

2. The cooling system of claim 1, wherein:
   the evaporator unit is mounted on the heat exchange unit.

3. The cooling system of claim 1, wherein:
   the heat exchange unit comprises a first tank communicated with the coolant outlet and a second tank communicated with the coolant inlet; and
   the evaporator unit is mounted on the first tank.

4. The cooling system of claim 1, further comprising:
   a water storage tank between the exhaust water outlet and the evaporator unit.

5. The cooling system of claim 1, wherein the evaporator unit comprises:
   a housing having a first housing portion, a second housing portion and a third housing portion;
   a blower mounted in the first housing portion for blowing air through the housing;
   the heat exchange unit being mounted in the third housing portion;
   a water spraying unit mounted in the second housing portion between the first housing portion and the third housing portion; and
   a water supply line for communicating exhaust water from the fuel cell stack to the water spraying unit, the water spraying unit spraying said exhaust water into air blown through the housing, said exhaust water evaporating and cooling said air.

6. The cooling system of claim 5, wherein the water spraying unit comprises:
   a plurality of water injectors spaced apart from each other.

7. The cooling system of claim 5, wherein the water spraying unit comprises:
   a plurality of water injectors spaced apart from each other and arranged in an annular array.

8. The cooling system of claim 5, further comprising:
   a porous evaporator member mounted in the housing between the water spraying unit and the heat exchange unit.

9. The cooling system of claim 1, wherein the evaporator unit comprises:
   a water injector receiving exhaust water via the conduit and spraying said exhaust water into said blown air.

10. The cooling system of claim 1, wherein the evaporator unit comprises:
    a water injector positioned between the blower and the heat exchange unit, the water injector receiving exhaust water via the conduit and spraying said exhaust water into said blown air; and
    a porous evaporator member mounted between the water injector and the heat exchange unit.

11. The cooling system of claim 1, wherein the evaporator unit comprises:
    a plurality of water injector positioned between the blower and the heat exchange unit, the water injectors being spaced apart from each other and receiving exhaust water via the conduit, each injector spraying said exhaust water into said blown air.

12. The cooling system of claim 1, wherein the evaporator unit comprises:
    an annular member mounted so as to be exposed to the blown air; and
    a plurality of water spray nozzles spaced apart and mounted on the annular member, the nozzles receiving exhaust water via the conduit and spraying exhaust water into the blown air.

13. The cooling system of claim 1, wherein the evaporator unit comprises:
    an annular member mounted so as to be exposed to the blown air, the annular member having a larger upstream end and a smaller downstream end with respect to a direction of blown air;
    an annular water supply tube receiving exhaust water via the conduit; and a plurality of water spray nozzles spaced apart and mounted on the annular member, the nozzles receiving exhaust water from the supply tube and spraying exhaust water into the blown air.

14. The cooling system of claim 13, wherein:

the annular member is hollow; and the water supply tube is separate from and enclosed by the hollow annular member.

15. The cooling system of claim 13, wherein:

the water supply tube comprises an annular bore formed in the annular member.

16. The cooling system of claim 13, wherein:

the water supply tube comprises an annular bore formed in the annular member; and each nozzle comprises an orifice in the annular member, each orifice being communicated with the annular bore by a supply passage formed in the annular member.

17. The cooling system of claim 1, wherein the evaporator unit comprises:

a water spraying unit mounted between the blower and the heat exchange unit;

a porous evaporator member mounted between the spraying unit and the heat exchange unit; and a water supply line for communicating exhaust water from the fuel cell stack to the water spraying unit, the water spraying unit spraying exhaust water into air blown through the evaporator member, said exhaust water evaporating and cooling said air before it encounters the heat exchange unit.

18. A cooling system for a fuel cell stack having a coolant inlet, a coolant outlet and an exhaust water outlet, the cooling system comprising:

a hollow housing;

a heat exchange unit mounted in the housing and coupled to the coolant inlet and the coolant outlet;

a coolant pump for circulating coolant through the heat exchange unit and the fuel cell stack;

a blower for blowing air through the housing towards the heat exchange unit;

a sprayer unit mounted in the housing between the blower and the heat exchange unit; and a conduit communicating exhaust water from the fuel cell stack exhaust water outlet to the sprayer unit, said exhaust water evaporating in the blown air and thereby cooling said air.

19. The cooling system of claim 18, further comprising:

a porous evaporator member mounted in the housing between the sprayer unit and the heat exchange unit.

20. The cooling system of claim 18, wherein the sprayer unit comprises:

an annular member mounted in the housing; and a plurality of spaced apart spray nozzles mounted on the annular member and communicated with the conduit.

21. The cooling system of claim 20, wherein:

the annular member has an aerodynamic shape.

22. The cooling system of claim 18, further comprising:

a plurality of radially extending support members which support the annular member within and spaced apart from the housing.

23. A cooling system for a fuel cell stack having a coolant inlet, a coolant outlet and an exhaust water outlet, the cooling system comprising:

a heat exchange unit coupled to the coolant inlet and the coolant outlet;

a blower for blowing air through the heat exchange unit;

a porous evaporator member mounted adjacent to the heat exchange unit and exposed to the blown air; and a conduit communicating exhaust water from the fuel cell stack exhaust water outlet to the evaporator member, said exhaust water evaporating in the blown air and thereby cooling said air.

24. The cooling system of claim 23, wherein:

the heat exchange unit has an upper coolant tank and a lower coolant tank; and a water distribution member is attached to a side of the upper coolant tank, the water distribution member having a plurality of weep holes formed therein, the conduit communicating exhaust water to the water distribution member, the evaporator member being mounted below the water distribution member so that exhaust water flows through the weep holes and into the evaporation member.

* * * * *